United States Patent [19]
Horton

[11] Patent Number: 5,836,241
[45] Date of Patent: Nov. 17, 1998

[54] HEAT TRANSFER SYSTEM

[75] Inventor: Peter Horton, Agawam, Mass.

[73] Assignee: SCM Container Machinery Limited, Overpool, England

[21] Appl. No.: 612,070

[22] Filed: Mar. 5, 1996

[51] Int. Cl.$^6$ .............................. B30B 5/02; B30B 15/34
[52] U.S. Cl. ..................... 100/311; 100/154; 100/211; 100/304; 156/470; 156/555; 156/583.3; 156/583.5
[58] Field of Search ..................................... 100/138, 154, 100/211, 302–315, 101, 103; 156/470, 555, 583.3, 583.5

[56] References Cited

U.S. PATENT DOCUMENTS

| | | | |
|---|---|---|---|
| 782,558 | 2/1905 | Hahn | 156/470 |
| 905,076 | 11/1908 | Hinde | 100/211 |
| 2,941,572 | 6/1960 | Densen et al. | 156/555 |
| 3,712,843 | 1/1973 | Gartaganis et al. | 156/583.5 |
| 4,311,550 | 1/1982 | Kerttula | 100/311 |
| 5,256,240 | 10/1993 | Shortt | 100/211 |
| 5,456,783 | 10/1995 | Sissons | 100/311 |

*Primary Examiner*—Stephen F. Gerrity
*Attorney, Agent, or Firm*—Bergert & Bergert

[57] ABSTRACT

A heat transfer system in which a continuous web of material (13, 14) is carried past a hot plate surface (12) with one face of the web in contact therewith, and a series of fluid-filled vessels (15) above the web to apply a load on the upper surface thereof to maintain uniform contact between the web and the hot plate surface irrespective of any undulation thereof. A transport section to convey the web past the hot plate surface comprises upper and lower traction belts (16, 17) disposed entirely beyond the end of the hot plate surface (12) with a fixed plate (18) beneath the lower belt (17) and a series of fluid-filled vessels (19) above the upper belt (16) which serve to maintain adequate drive contact between the belts (16, 17) and the web (13, 14). By positioning the traction belts beyond the heating section of the system belt wear is minimized when compared with known systems where an upper traction belt passes also through the heating section, and still further the length of the upper belt is reduced thus minimizing manufacturing costs.

3 Claims, 2 Drawing Sheets

HEAT TRANSFER SYSTEM

BACKGROUND AND SUMMARY OF THE INVENTION

This invention concerns heat transfer systems wherein a continuous web of material is to be transported across the surface of one or more hot plates whereby the web is subjected to an elevated temperature for a predetermined period.

Particularly, though not exclusively, the invention is concerned with corrugating machinery in which a continuous web of single-faced fluted board with glue applied to the exposed tips of the fluted sheet is brought together with a liner which is thus bonded to the glued tips to form a double-faced board, and the composite board is carried past a bank of heaters which assist in the bonding of the liner to the corrugated tips of the single-faced board.

A system of this kind usually incorporates means for imposing a load on the opposite face of the web from that which is in contact with the heaters thus to maintain uniform contact between the board and the heated surface, in order to ensure adequate heat transfer.

Since, with such equipment, there is a tendency for the hot plate surfaces to become distorted, the load applying means is so designed as to present a flexible surface so that the web is held with a substantially uniform pressure over its entire width against the hot plate surfaces as it travels through the system. Several different arrangements have been proposed for this purpose such as fluid-filled vessels and spring-loaded or pivotal shoes.

In order to transport the web over the hot plates, a traction device is provided downstream of the heat transfer system in the direction of travel of the web and consisting of a pair of traction belts disposed respectively on opposite faces of the web. One of the traction belts usually carries the web through the heat transfer system and thus travels with the web over the hot plate surface. This leads to wear of the top traction belt as it passes through the heating section, particularly when the belt is wider than the web and thus in its edge regions is in sliding contact with the heated surface.

According to the present invention there is provided a heat transfer system in which a continuous web of material is carried past a hot plate surface with one face of the web in contact therewith, there being means imposing a load on the opposite face of the web to maintain said contact between the web and the hot plate surface, and conveying belt means for transporting the web past the hot plate surface; characterised in that the load applying means is in direct contact with the web as It travels past the hot plate surface.

Preferably, the conveying belt means comprises a pair of traction belts disposed respectively on opposite faces of the web, each said belt being disposed entirely beyond the hot plate surface in the direction of conveyance of the web.

BRIEF DESCRIPTION OF THE DRAWINGS

An embodiment of the invention will now be described, by way of example only, with reference to the accompanying schematic drawings, FIGS. 1 and 2 which illustrate a heat transfer system made in accordance with the invention.

DESCRIPTION OF THE PREFERRED EMBODIMENTS

Figure 1:
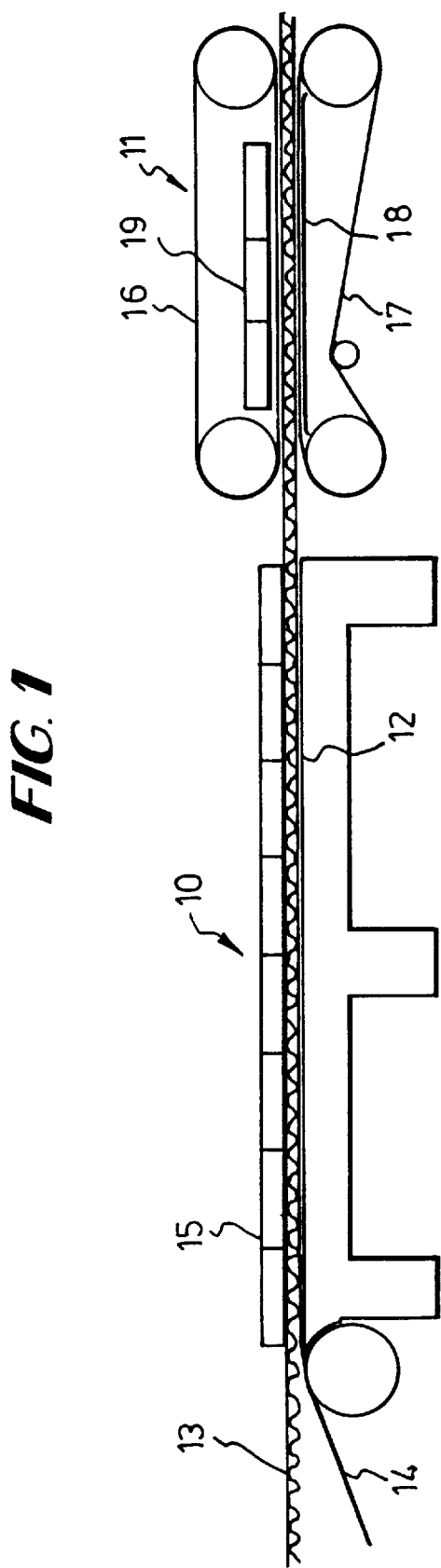
Figure 2:
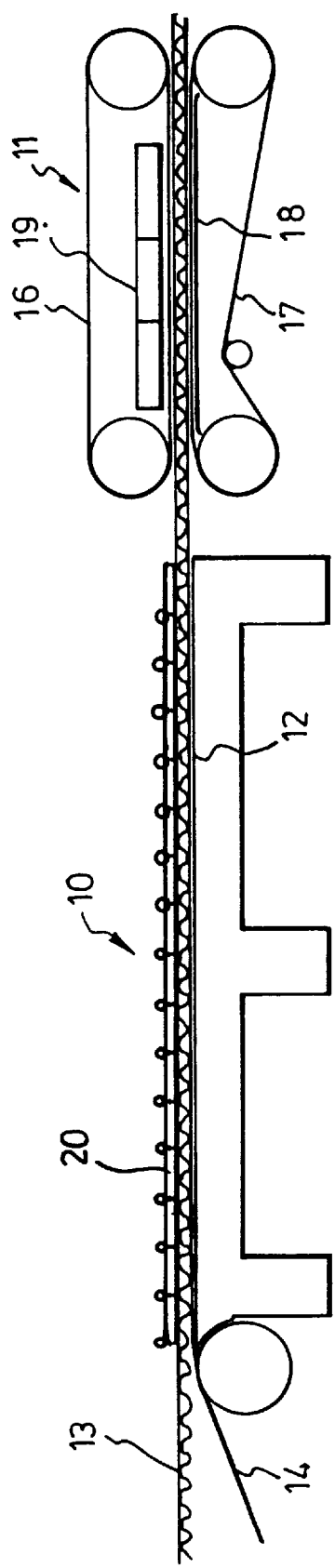

The system, as shown in FIGS. 1 and 2, comprises a heating section 10 and a web transport section 11. The heating section 10 comprises a bank or series of heating chests having a common upper hot plate surface 12.

In this example, a single-faced corrugated board 13 is fed to the left-hand or input end of the transfer system as illustrated in the drawing, having an adhesive applied to the corrugated tips of the board which is to be combined with a plain liner sheet 14 and transported across the hot plate surface 12 so that the adhesive may be cured.

Located above the heating chests is a series of fluid-filled vessels 15 a combined purpose of which is to apply a substantially constant load upon the double-faced board thus holding it down firmly against the hot plate surface of the heating chests irrespective of any undulation thereof, thus to transfer heat substantially uniformly to the board.

The double-faced board is transported past the heating chests by the traction section 11 which consists effectively of a pair of traction belts 16 and 17 disposed respectively on the upper and lower faces of the board, and these are driven by a common drive system thus to transport the board at a substantially uniform speed through the system.

Located beneath the lower belt 17 is a fixed platform 18 over which the belt travels, and above the upper belt 16 is a short series of fluid-filled vessels 19 similar to the vessels 15 in the heating section 10. These vessels 19 serve to maintain adequate drive contact between the belts 16 and 17 and the corrugated board.

By positioning both upper and lower traction belts entirely beyond the heating section 10 this serves to minimise belt wear, and, when compared with a known system in which an upper traction belt passes also through the heating section, not only is belt wear reduced still further but the length of the upper belt is also reduced thus minimising manufacturing costs.

It is not intended to limit the invention to the above example. In particular, the fluid-filled vessels 15 may be replaced by a flexible surface made up of, for example, individual pivoted or spring-loaded shoes 20 the overall purpose of which is to maintain uniform contact between the web and the heated surface.

I claim:

1. A heat transfer system in which a continuous web of material is carried past a hot plate surface with one face of the moving web in contact therewith, there being means applying a load on the opposite face of the web to maintain said contact between the web and the hot plate surface, and conveying means for transporting the web past the hot plate surface; characterized in that the load applying means is in direct contact with the web as it travels past the hot plate surface, said load applying means comprising a series of fluid-filled vessels adapted to apply a substantially constant load upon the web thus holding it down firmly against the hot plate surface irrespective of any undulation thereof, and further characterized in that the conveying means is disposed entirely beyond the hot plate surface in the direction of conveyance of the web.

2. A heat transfer system in which a continuous web of material is carried past a hot plate surface with one face of the moving web in contact therewith, there being means applying a load on the opposite face of the web to maintain said contact between the web and the hot plate surface, and conveying means for transporting the web past the hot plate surface; characterized in that the load applying means is in direct contact with the web as it travels past the hot plate surface, and further characterized in that the conveying means is disposed entirely beyond the hot plate surface in the direction of conveyance of the web, the conveying means comprising a pair of traction belts disposed respectively on opposite faces of the web, wherein the traction belts are driven by a common drive system arranged to transport the web through the system at a substantially uniform speed, said heat transfer system further including a fixed platform located beneath the lower of said traction belts and over which the belt travels, and at least one fluid-filled vessel located above the upper of said traction belts thus to maintain drive contact between the traction belts and the web.

3. A heat transfer system in which a continuous web of material is carried past a hot plate surface with one face of the moving web in contact therewith, there being means applying a load on the opposite face of the web to maintain said contact between the web and the hot plate surface, and conveying means for transporting the web past the hot plate surface; characterized in that the load applying means is in direct contact with the web as it travels past the hot plate surface, said load-applying means comprising a flexible surface consisting of individual pivoted or spring-loaded shoes the overall effect of which is to maintain uniform contact between the web and the heated surface, and further characterized in that the conveying means is disposed entirely beyond the hot plate surface in the direction of conveyance of the web.

* * * * *

UNITED STATES PATENT AND TRADEMARK OFFICE
CERTIFICATE OF CORRECTION

PATENT NO.   :   5,836,241
DATED        :   November 17, 1998
INVENTOR(S)  :   Peter Horton It is certified that error appears in the above-indentified patent and that said Letters Patent is hereby corrected as shown below:

TITLE PAGE:

Foreign Application Priority Data information, insert

--Item [30] Foreign Application Priority Data

April 6, 1995 [GB] United Kingdom 9507112.2 --.

Signed and Sealed this

Twenty-first Day of December, 1999

Attest:

Q. TODD DICKINSON

*Attesting Officer*   *Acting Commissioner of Patents and Trademarks*